3,781,214
PHOTOPOLYMERIZABLE PRINTING INK
Yuhei Nemoto, Tokyo, and Shiro Takahashi, Omiya, Japan, assignors to Dainippon Ink and Chemicals, Incorporated, Tokyo, Japan
No Drawing. Filed Nov. 23, 1971, Ser. No. 201,497
Claims priority, application Japan, Nov. 25, 1970, 45/103,301
Int. Cl. C09d 11/10
U.S. Cl. 260—22 TN  3 Claims

ABSTRACT OF THE DISCLOSURE

Photopolymerizable printing ink which is cured under irradiation of ultraviolet rays and is characterized in that the same comprises a photopolymerizable, unsaturated compound obtained by the reaction of (I) a hydroxyl group-containing, fatty oil-soluble compound with (II) a compound containing an isocyanate group and a photopolymerizable, unsaturated bond, and a glyceride of an unsaturated fatty acid containing a conjugated double bond, as the essential vehicle components.

---

This invention relates to printing ink which can be cured and dried within extremely short time under irradiation of ultraviolet ray.

More particularly, the invention relates to a printing ink which is prepared by adding a suitable photo-initiator to the ink vehicle comprising, as the essential components, a specific photo-polymerizable unsaturated compound which is compatible with fatty oils and cured by addition polymerization under irradiation of ultraviolet rays and a glyceride of an unsaturated fatty acid having a conjugated double bond or bonds, and optionally, as other components, various oils, resins, resinous varnishes, solvents, etc., and further, if necessary, prepared by milling with and dispersing in colorants such as pigments and dyes and such additives as extenders and auxiliary agents.

The printing ink of this invention is useful as a lithographic offset ink, letterpress printing ink, intaglio ink, and screen process ink, and can be cured and dried within extremely short time under irradiation of ultraviolet rays from suitable irradiation equipment.

Recent progress in printing techniques in various printing processes is indeed remarkable, but still the speeding-up of the printing rate is a strong demand of the field. Particularly in the lithographic offset printing, letterpress printing, intaglio printing, and screen process printing using oxidative polymerization type ink or quick set type ink, the printing rate depends on the drying speed of the printing ink. Conventional inks have the common deficiency of slow drying, and in order to compensate for the deficiency auxiliary means are practiced during the prints-drying process such as frequent transfer of printed matters onto hurdles, spraying powders on the printed matters, etc., to prevent set-off of prints in the delivery of the printing machine, or the prints are exposed fresh air before subjected to such post-procedures as cutting, bookbinding, etc. Particularly in the lithographic offset printing, letterpress printing, intaglio printing, or screen process printing in which the printed matters have non-absorbing surfaces such as of aluminum foil, plastic film, special processed paper, etc., the quick set mechanism, wherein the solvents or oils penetrate into the paper due to capillary phenomena occurring at the surfaces of printed matters to convert the printing ink from sol to gel, cannot take place. Therefore, in such cases drying of printing ink almost exclusively depends on the oxidative polymerization rate of ink vehicle. Thus, drying of such printed matters requires several to ten and several hours, which seriously reduces the productivity of those printed matters. On the other hand, heat set type offset rotation printing and metallic plate printing are known as the printing systems utilizing external heat energy for improving the drying speed of printing ink. However, in both systems, enormous equipment cost is required for the drying oven, and furthermore, in the tin plate printing, a dry-printing method for each color must be adopted for multi-color printing, which consumes excessive labor, time, and heat energy.

Accordingly, the object of this invention is to provide such printing ink which eliminates the extra labor, materials, and waiting time, etc. required due to the slow drying speed of known printing inks in the lithographic offset printing, letter press printing, intaglio printing, and screen process printing, and can remarkably accelerate the printing speed.

A further object of this invention is to provide an ultraviolet ray-curable, quick drying printing ink which enables the substitution of the heat-drying oven employed in the heat set type web offset printing and tin plate printing with an ultraviolet ray radiator, thereby providing very substantial reduction in equipment cost for those printing systems and improvements in the printing efficiency and quality.

The concept of drying printing ink by ultraviolet ray irradiation is known, that is, Japanese patent publication No. 10,606/57 discloses that the printing ink composed of a thermal reaction product of a glyceride of an unsaturated fatty acid containing two to four conjugated double bonds with maleic acid resin, a drier, and pigment, could be dried quickly by irradiation of ultraviolet rays.

Also U.S. Pat. No. 2,453,769 discloses that the composition prepared by adding methane bromide, methane iodide, and nitro derivatives of methane or a halogenide such as hexachlorophenol, as a photosetting promotor, to the ink vehicle containing at least 20% of eleostearate and ketoeleostearate, can be dried to a state that will not stain the adjacent under surface of the printing paper within a few seconds, when irradiated with the radiation energy within the ultraviolet rays wave band of 280 to 350 nm. only.

However, those known ultraviolet ray drying type printing ink are no more than attempts to simply apply the polymerization-promoting effect of ultraviolet rays for tung oil, etc. to printing ink to increase the latter's drying speed, and their set-drying speeds are 15 seconds for the former and 11 seconds for the latter, under the ultraviolet ray irradiation conditions identical with those of the later given working examples of this invention. Thus they show no more than a relatively slow setting property. In addition, the first-mentioned prior art ink is subject to such deficiencies as that, (1) due to the preparation of vehicle through reaction of tung oil or the like with maleic acid resin, the ink contains a large quantity of maleic acid resin and consequently the ink cannot withstand the practical use in lithographic offset printing, because of its poor durability to water, (2) the preparation process of the vehicle is not as practical and appropriate as that for making a stable quality vehicle varnish, because it requires reaction of tung oil or the like with maleic acid resin at temperatures causing gelation of tung oil or the like (approximately 230° C.), and (3) because the vehice contains large quantities of fatty oil of which the chief component is an unsaturated fatty acid having conjugated double bonds, and maleic acid resin, the type of other vehicles concurrently usable with this vehicle is severely limited. On the other hand, the latter ink is free from the above deficiencies due to the adoption of photosetting promotors but the selection of the named photosetting promotors is inappropriate. Therefore, in spite of the fact that the radiation energy of ultraviolet ray wave band ranging approximately from 200 to 400 nm. is industrially easily available, the system requires such inefficient ultraviolet ray hardening method that the wave hand of 245–260 nm. must be cut, and the radiation energy of specific wave band of 280–350 nm. alone is utilized. This signifies the increase in equipmental and running costs of the radiation apparatus and in the floor area required for the apparatus in the industrial scale working of the system, which obviously are economically very disadvantageous factors.

The printing ink of this invention comprises, as the essential vehicle components an ultraviolet ray addition polymerizable, unsaturated compound formed by reaction of an addition polymerizable unsaturated compound obtained by the reaction of a hydroxyl group-containing compound which is compatible with fatty oil (I) with a compound containing isocyanate radicals and addition polymerizable unsaturated linkages (II), and a glyceride of an unsaturated fatty acid having a conjugated double bond or bonds. The same ink furthermore comprises a suitable amount of ultraviolet ray polymerization initiator. The ink of this invention is suitably used as a lithographic offset ink, letterpress printing ink, intaglio ink and screen process ink, and can be very quickly dried and hardened by the effective utilization of total radiation energy of the ultraviolet ray wave band of approximately 200 to 400 nm. which is usable with industrial convenience, as such is readily available from small size radiation apparatus.

Furthermore, the preparation of present printing ink is subject to no critical limitation as to the starting materials and blending method, other than that the vehicle component must contain the above-specified ultraviolet ray addition polymerizable, unsaturated compound and the glyceride of an unsaturated fatty acid having a conjugated double bond or bonds and that an ultraviolet ray polymerization initiator must be added to the ink. That is, conventional vehicle materials employed in lithographic offset ink, letterpress printing ink, itaglio ink, and screen process ink, such as fatty oils, resins, resin varnishes, solvents, etc., can be freely incorporated at optional quantitative ratios, depending on the type of printing plate, printing system, or the intended utility, to impart to the product suitable printability and ink characteristics. According to the invention, therefore, the printing inks for named plate types having sufficient printability and ink characteristics can be prepared by mixing the vehicle of this invention with optional pigments, dyestuffs and bodies or assistants by means of three rolls or a kneader, similarly to the conventional printing ink preparation, or a milling of the vehicle with those flush bases.

Many photo-sensitive compounds or photo-polymers are already known. For example, photo-dimerizable polymers represented by polyvinyl cinnamate; photo-decomposition type polymers such as the series of diazo- and azide-compounds; photo-polymerizable polymers such as polymer plus monomer system, etc. have been industrially utilized in the fields of plate making materials and paints. Particularly, most of the presently known photopolymer paints belong to the category of photo-polymerizable polymers, which generally are composed of polymer bases containing addition polymerizable unsaturated radicals in their molecules, such as unsaturated polyester type polymers and acrylic polymers, blended with vinyl monomers and photo-polymerization initiators. However, those polymer bases generally are insufficiently or hardly soluble in fatty oil, particularly vegetable drying oil, such as linseed oil, tung oil, and the like, although they show sufficient solubility in the monomers used in combination therewith.

The ultraviolet ray addition polymerizable unsaturated compound which is an essential vehicle component of the subject printing ink is that produced by the reaction of the previously specified two types of compounds as the indispensable reactants, and consequently shows satisfactory oil-solubility, particularly sufficient compatibility with vegetable drying oils such as linseed oil, tung oil, etc. as well as the ultraviolet ray addition polymerizable property. This is the unique feature of the compound, never expected of the known series of photo-polymerizable polymers as above-mentioned.

Any printing ink must possess the satisfactory printability for intended utility, to meet the requirement which may slightly vary for each specific type of plate and printing system. Particularly the inks for lithographic and relief printing are subject to numerous limitations incurred by the printing machine. Normally the printability of an ink is determined mainly by its vehicle characteristics. For example, the vehicle component of lithographic relief printing ink, particularly lithographic offset ink, must essentially possess; (1) suitable viscosity such as approximately 500–5,000 poises as well as suitable elasticity, plasticity, and length or thixotropic property, (2) even and sufficient wettability and transferability to all the materials employed in the series of ink transfer procedures from the ink reservoir to the printed papers, via rollers, plate, and blanket; (3) adaptability to allow sufficient and stable dispersion of conventionally employed pigments, dyestuffs and bodies therein; and (4) suitable degree of durability against water. Among the industrially available materials satisfying all of the above conditions, a group of fatty oils represented by vegetable drying oils are the most preferred.

Furthermore, lithographic and letterpress printing inks need to migrate or be transferred over more than ten to twenty rollers which are the alternately disposed combinations of metallic rollers and rubber rollers, stably as thin ink film of approximately $10\mu$ in thickness, during the distribution procedure on the printing machine. For such stable transfer of printing ink in the distribution procedure, the vehicle of the ink should not contain more than ten and several percents by weight of low boiling point materials boiling at temperatures below 250° C., such as solvents. That is, such low-boiling point materials in the ink vehicle evaporate during the distribution procedure on the printing machine to alter rheological characteristics of the ink, and thereby deteriorate the ink distribution property and transferability in such procedure, i.e., provide the cause of so-called poor roller stability. In addition, the rubber rollers and blanket are occasionally made of a synthetic rubber such as butadiene-nitrile rubber, and the graduating portion of lithographic offset plates, of synthetic resin lacquers such as a vinyl chloride-vinyl acetate copolymer. Both of those materials show considerable swellability or solubility to aromatic, ester type, and ketone type solvents. Therefore use of such solvents is again quantitatively severely limited.

Presently known photo-sensitive resin paints are given the composition of polymer base plus polymerizable monomer plus polymerization initiator at such quantitative ratios as will allow the hardening of the paint to a coating of a reticulated structure within the shortest possible time under photo-irradiation as well as the suitable adjustment of the paint's rheological characteristics. For this reason, low boiling point materials boiling at around 100–260° C., such as styrene, methyl methacrylate, butyl acrylate, ethylene glycol dimethacrylate, diethylaminoethyl methacrylate, 2-ethylhexyl methacrylate, etc., are normally used as the polymerizable monomers. (As well known, use of higher boiling point substances as the polymerizable monomers appreciably slows down the hardening speed of such paint systems.) Those low boiling point polymerizable monomers could impair the storage stability of the paints, when incorporated into the vehicles, and furthermore occasionally exhibit remarkable swellability and solubility to the aforementioned construction materials of a printing machine, such as the synthetic rubber and resin lacquer, etc. In short, utilization of such photo-sensitive resin paints using low boiling point polymerizable monomers as the vehicle component of printing ink is extremely inappropriate.

It was previously discovered that both transparent printing inks containing no pigment (medium) and the inks containing up to approximately 20 wt. percent of pigments, which are formed by adding a suitable amount of suitable ultraviolet ray polymerization initiator to an ink vehicle system containing a glyceride of an unsaturated fatty acid having a conjugated double bond or bonds, such as of tung oil, can be set-dried within 5 seconds on coated paper, under identical irradiation and spreading conditions with those later described in examples. Therefore, it can be expected that, if such a compound, which is compatible with the glyceride of an unsaturated fatty acid having conjugated double bonds and shows excellent setting property under ultraviolet ray irradiation, so that the system composed of such a compound dissolved in the glyceride may show higher set-drying property than that of the above-described ultraviolet ray polymerizable and hardenable system containing the glyceride alone as the vehicle component, could be synthesized, an excellent printing ink vehicle may be provided. Furthermore, with such novel printing ink vehicle, the various inconveniences and dangers incidental to the attempts to apply known photo-sensitive resin paints and polymerizable monomers to printing ink vehicle systems would be eliminated; all the essential requirements for printing ink vehicles, particularly that of lithographic offset printing, would be satisfied; a very high ultraviolet ray set-drying property would be imparted to the printing ink; and a dry ink film of at least an equal degree of film characteristics to those of conventional printing ink films would be provided.

Based on the above expectations, studies, were continued to eventually discover that the unsaturated compounds obtained through the reaction of (I) hydroxyl group-containing compounds which are compatible with fatty oil with (II) compounds containing isocyanate radicals and addition polymerizable unsaturated linkages, show very high ultraviolet ray polymerizable property, and that the mixtures of such unsaturated compounds with glycerides of unsaturated fatty acids having conjugated double bonds are useful as the ideal printing ink vehicle as above-anticipated.

Typical examples of the compounds (I) which contain hydroxyl groups and are compatible with fatty oil, and which are used for synthesizing the ultraviolet ray addition polymerizable, unsaturated compounds, are the group of oil-soluble, modified alkyd resins containing suitable amounts of residual hydroxyl groups. Such modified alkyd resins are obtained by the reaction of the following three components according to accepted practice, i.e. (1) a polyvalent carboxylic acid such as phthalic anhydride, isophthalic acid, therephthalic acid, o-phthalic acid, maleic anhydride tetrahydrophthalic anhydride, hexahydrophthalic acid, succinic acid, succinic anhydride, tetrachlorophthalic anhydride, HET acid, adipic acid, sebaid acid, rosin-maleic anhydride adduct, 1,2,4-benzenetricarboxylic anhydride, and 1,2,4,5-benzenetetra carboxylic anhydride, etc., (2) a polyhydric alcohol such as ethylene glycol, propylene glycol, diethylene glycol, 1,4-butylene glycol, 1,3-butylene glycol, 2,3-butylene glycol, neopentyl glycol, glycerin, trimethylolpropane, trimethylolethane, 1,2,6-hexanetriol, pentaerythritol, sorbitol, diglycerol, and dipentaerythritol, etc.; and (3) a modifying agent uch as linseed oil, tung oil, dehydrated castor oil, perilla oil, soybean oil, safflower oil, coconut oil, oiticica oil, whale oil, shark oil, cuttlefish oil, rice bran oil, cotton seed oil, tall oil, fatty acids of foregoing oils, rosin, rosin modified phenol resin, phenolic resin, epoxy resin, styrene, acrylate methacrylate, polyisocyanate, and vinyltoluene, etc. In the composition of the starting materials for such a modified alkyd resin, the equivalent ratio of hydroxyl groups to the carboxyl groups, in the total amount of materials, is desirably within the range of 0.67 to 1.5, inclusive of epoxy radicals. Incidentally, in the above esterification reaction, a part of the polyvalent carboxylic acid may be replaced by a monovalent carboxylic acid, and a part of the polyhydric alcohol, by a monohydric alcohol. Also the esterification reaction is not necessarily advanced until 100% of the functional groups in the minor component between the acid and alcohol are reacted, but the reaction may be terminated at a suitable stage to leave a suitable amount of carboxyl groups and/or hydroxyl groups unreacted.

As still other examples of the compound (I), ester compounds containing by-produced hydroxyl groups, obtained by addition reaction of higher fatty acids and rosin with epoxy resins as well as the ester compounds containing by-produced hydroxyl groups which are obtained through the addition reaction of polyvalent carboxylic acids with higher alcohols and unsaturated monoepoxy compounds such as glycidyl acrylate, glycidyl methacrylate, allyl glycidyl ether, etc., may be named.

As the compound (II) containing isocyanate radicals and addition polymerizable, unsaturated linkages, to be used for making the ultraviolet ray addition polymerizable, unsaturated compound according to the invention, for example, the reaction products of (a) a polyisocyanate compound such as 2,4-tolylenediisocyanate, 2,6-tolylenediisocyanate, 2,4-xylylenediisocyanate, lysinediisocyanate, diphenylmethane - 4,4' - diisocyanate, triphenylmethane-4,4',4''-triisocyanate, naphthylene - 1,5-diisocyanate, 3,3'-dimethyldiphenylmethane-4,4'-diisocyanate, diphenylether-4,4'-diisocyanate, diphenyl - 2,4,4 - triisocyanate, 1,3,5-trimethylbenzene-2,4,6-triisocyanate, and diphenylmethane-2,4,2',4'-tetraisocyanate, etc. with (b) addition polymerizable, unsaturated compound having one hydroxyl group, such as 2-hydroxyethyl methacrylate, 2-hydroxyethyl acrylate, 2-hydroxypropyl acrylate, 2-hydroxypropyl methacrylate, N-hydroxymethyl acrylamide, N-hydroxymethyl metharylamide, polyethylene glycol monoacrylate, polypropylene glycol monomethacrylate, glycerin dimethacrylate, trimethylolpropane dimethacrylate, pentaerythritol trimethacrylate, allyl alcohol, 2-chloroallyl alcohol, and equimolar reaction product of glycidyl methacrylate with acrylic acid, etc. may be named. When a diisocyanate is used as the polyisocyanate compound, the above compounds (a) and (b) can be reacted at substantially equimolar ratio.

In the preparation of the group of ultraviolet ray addition polymerizable, unsaturated compounds by the reaction of compounds (I) and (II) according to the invention, it is not always necessary to react all the residual hydroxyl groups in the compound (I) with the free isocyanate radicals of the compound (II). It is desirable, however, that the ultraviolet ray addition polymerizable, unsaturated compound should contain, per 1000 molecular weight, 0.2–3.0 preferably 0.5–2.0, addition polymerizable unsaturated linkages which are introduced by compound (II). Again, if the compound (I) contains residual carboxyl groups, a part of the carboxyl groups may be optionally esterified with an unsaturated monoepoxy compound such as glycidyl acrylate, glycidyl methacrylate, or allyl glycidyl ether.

The ultraviolet ray addition polymerizable, unsaturated compound employed in this invention contains the addition polymerizable unsaturated linkages originating from compound (II), and furthermore the urethane linkages formed by the reaction of compounds (I) and (II). Consequently, the compound can be dried and hardened under ultraviolet ray irradiation, even in the presence of oxygen. Furthermore, because the oil-soluble compound (I) is used as one of the reactants, the compound can be suitably mixed with fatty oil.

For the fuller explanation of synthesizing method of the ultraviolet ray addition polymerizable, unsaturated compound, specific examples of the synthesis are given hereinbelow, with the understanding that they are strictly illustrative of the method, but in no way limitative of the scope of such compound.

EXAMPLE OF SYNTHESIS 1 (SYNTHESIS OF SAMPLE NO. 1)

A four neck flask of 2,000 ml. in capacity was equipped with a 360° C. thermometer, glass agitation rod, nitrogen gas inlet tube and tortuous cooling pipe. Into the flank, 760 g. of alkali-refined linseed oil and 203.5 g. of isophthalic acid were charged, and stirred under nitrogen gas supply. The temperature of the system was raised at a constant rate, until 260° C. was reached after 3 hours stirring. At such temperature acidolysis was effected. In the meantime, 12 g. of sample were withdrawn from the system at regular intervals. When the mixture of such sample with 1 g. of glycerine heated to 220–230° C. became transparent, the reaction was terminated.

The temperature of the system was lowered to 200° C., whereupon 80.3 g. of glycerin were added to the system. Thereafter the reaction was continued for approximately 10 hours, at a raised temperature of 235° C.

Thus a transparent, linseed oil modified alkyd resin having a viscosity of 75–85 poises, an acid value of 10–20, and a hydroxyl value of 30–40, was obtained, which was labelled as alkyd resin A.

A three neck flask of 1,000 ml. in capacity was equipped with a 200° C. thermometer, glass agitation rod, and a tortuous cooling pipe, and charged with 348 g. of tolylenediisocyanate (composed of 2,4-isomer 80%, and 2,6-isomer 20%) and 152 g. of ethyl acetate. The temperature of system was raised at a constant rate under stirring which reached 70° C. after an hour. At such temperature, 260 mg. of para-benzoquinone were added to the system, and still under stirring, 260 g. of 2-hydroxypropyl acrylate (containing 300 p.p.m. of hydroquinone monomethyl ether) were added dropwise consuming approximately an hour and a half. The stirring was further continued for an additional 1.5 hours. The reaction was terminated when the free isocyanate radical content of the system was reduced to approximately 11%, and the system was cooled to room temperature. The compound obtained was a yellow, transparent liquid, having a viscosity of approximately 0.2 poise. The compound tended to solidify when allowed to stand in air. This product will be called compound B.

A three neck flask of 500 cc. capacity was equipped with a 200° C. thermometer, glass agitation rod and a tortuous cooling pipe, and charged with 300 g. of above alkyd resin A, which was heated at a constant rate, reaching 70° C. after one hour of heating under stirring. At such temperature, several drops of dibutyltin diacetate were added to the system under stirring. Thereafter 75.9 g. of the compound B were dropped into the system still under stirring, consuming approximately 30 minutes. The system was maintained at 70° C. for an additional 10 hours, under stirring, until the free isocyanate radical content was reduced to not more than 0.5%, and then cooled to normal temperature. Thus the sample No. 1 of the ultraviolet ray addition polymerizable, unsaturated compound was obtained, which was transparent and sufficiently compatible with vegetable oil, and had a viscosity of approximately 16 poises as measured of its 67 wt. percent toluene solution.

EXAMPLE OF SYNTHESIS 2 (SYNTHESIS OF SAMPLE NO. 2)

The same apparatus used in above Example of Synthesis 1 (the four neck flask) was charged with 704 g. of alkali-refined linseed oil. The temperature of the content was raised at a constant rate under stirring and while nitrogen gas was blown thereinto, the temperature reaching 180° C. after approximately an hour. Then 64 g. of pentaerythritol were added. The system was further heated at the same rate, and became 240° C. within approximately 30 minutes. Here 1 g. of litharge was added to the system, followed by alcoholysis at the same temperature. At regular intervals, 3 g. of sample were taken out and the transparency of the liquid mixture of the sample with 12 g. of ethanol was examined at room temperature. When the mixture became transparent, the reaction was terminated.

Then the system was cooled to 180° C., 147 g. of isophthalic acid were added, and the system was heated again to 246° C. within approximately 30 minutes, followed by approximately 10 hours reaction at such temperature. In the meantime, product sample was taken at every 2 hours, and when the sample was identified to be a transparent, linseed oil modified alkyd resin having an acid value of 10–20, and a viscosity of 60–70 poises, the reaction was terminated. The hydroxyl value of the resin was then approximately 25. This was labelled as alkyd resin C.

The 500-ml. capacity three neck flask as employed in Example of Synthesis 1 was charged with 300 g. of above alkyd resin C. The temperature of the resin C was raised at a constant rate under stirring, the temperature reaching 70° C. after approximately an hour. At such temperature, several drops of dibutyltin acetate were added, and thereafter 49.5 g. of the compound B prepared in Example of Synthesis 1 were dropped into the system still under continuous stirring, consuming approximately 30 minutes. The stirring was further continued at 70° C., until the free isocyanate radical content of the system was reduced to 0.5%, when the reaction was terminated and the system was cooled to normal temperature.

As a result, Sample No. 2 of the ultraviolet ray addition polymerizable, unsaturated compound was obtained as a transparent, resinous substance, which exhibited sufficient compatibility with vegetable oil, and had a viscosity of approximately 5.5 poises as its 67 wt. percent toluene solution.

EXAMPLE OF SYNTHESIS 3 (SYNTHESIS OF SAMPLE NO. 3)

A 500-ml. capacity, three neck flask was equipped with a 200° C. thermometer, glass agitation rod, and a tortuous cooling pipe, and was charged with 270 g. of vinyltoluene modified alkyd resin ("Styresol M 1112," product of Dainippon Ink & Chemicals, Inc., which has an acid value of approx. 14, and a hydroxyl value of approx. 53) and 30 g. of light oil. The system temperature was raised at a constant rate, which reached 80° C. after approximately an hour. At such temperature, several drops of dibutyltin acetate were added to the system under continuous stirring, and then 97.2 g. of the compound B prepared in Example of Synthesis 1 were added dropwise, consuming approximately 30 minutes. Still at the same temperature under stirring, the reaction was continued for approximately 10 hours, until the free isocyanate radical content of the system was reduced to 0.5%. The system was then cooled to normal temperature, to provide Sample No. 3 of the ultraviolet ray addition polymerizable, unsaturated compound.

This compound was a highly viscous, transparent resinous substance which exhibited excellent compatibility with vegetable drying oil.

EXAMPLE OF SYNTHESIS 4 (SYNTHESIS OF SAMPLE NO. 4)

The same four-neck flask reactor as employed in Example of Synthesis 1 was charged with 783 g. of alkali-refined linseed oil and 195 g. of tung oil, and under continuous gaseous nitrogen supply, the system was heated at a constant rate. The system temperature reached 180° C. after approximately one hour of heating. At such temperature, 151.5 g. of glycerin was added, and then the system was reheated to 246° C. during the following period of approximately an hour. Then 0.7 g. of lithium hydroxide was added to the system, followed by alcoholysis at the same temperature. In the meantime, 3 g. of sample were taken out from the system at regular intervals, so as to examine the degree of transparency of the sample mixture with 12 g. of ethanol at normal temperature. When it became transparent, the reaction was terminated, and the system was cooled to 180° C. Then 18 g. of isophthalic acid were added, followed by re-heating of the system to 246° C., and approximately 2 hours reaction. In the meantime, the acid value and viscosity of the product were measured at regular intervals, and when the former reached 18–20, the reaction was terminated. Thus a transparent, linseed oil modified alkyd resin was obtained, a 67 wt. percent toluene solution of which had a viscosity of 1.5 poises, and which had a hydroxyl value of 50–55. This was labelled as alkyd resin D.

The same 500-ml. capacity, three neck flask reactor as used in Example of Synthesis 1 was charged with 250 g. of the above alkyd resin D, and the resin was heated at a constant rate. When the temperature reached 100° C. after 1.5 hours heating, 40 mg. of para-benzoquinone and 40 mg. of 2-methylimidazole were added to the resin at such temperature, under stirring. Then 14.4 g. of glycidyl methacrylate were dropped into the system, consuming approximately 30 minutes. The reaction was continued until the acid value became 7. The system was cooled to 80° C., several drops of dibutyltin diacetate, were added and then 105.5 g. of compound B prepared in Example of Synthesis 1 were added dropwise, which required approximately 30 minutes. Still at 80° C., the reaction was continued under stirring, until the free isocyanate radical content of the system was reduced to 0.5%. Then the system was cooled to normal temperature.

As a result Sample No. 4 of the ultraviolet ray addition polymerizable, unsaturated compound was obtained as a viscous, transparent substance, which showed good compatibility with vegetable oil. The viscosity of a 67 wt. percent toluene solution of Sample No. 4 was approximately 13 poises.

EXAMPLE OF SYNTHESIS 5 (SYNTHESIS OF SAMPLE NO. 5)

The same 1,000-ml. capacity, four neck flask reactor as employed in Example of Synthesis 1 was charged with 428.8 g. of alkali-refined linseed oil and 107.2 g. of tung oil. The system temperature was raised at a constant rate under stirring, while nitrogen gas was blown into the system, until it reached 180° C. after approximately an hour. At such temperature, 108.8 g. of trimethylolpropane were added, and the system was further heated to 246° C. While the above temperature was maintained 10.4 g. of lithium hydroxide were added under stirring to effect alcoholysis. In the meantime, 3 g. of sample were taken out of the system at regular intervals, and when the liquid mixture of the sample with 12 g. of ethanol became transparent at normal temperature, the reaction was terminated. Then the system was cooled to 180° C. and 155.2 g. of isophthalic acid were added to react until the acid value of the product became 13–15. Thus, a semi-transparent, linseed oil modified alkyd resin having a viscosity of 160–180 poises and a hydroxyl value of 50–60 was obtained, which was labelled as alkyd resin E.

A 1,000-ml. capacity, four neck flask was equipped with a 200° C. thermometer, glass agitation rod, tortuous cooling pipe and a sample dripping tube, and was charged with 700 g. of the above alkyd resin E. The resin was heated at a constant rate, up to 70° C. after approximately an hour. Several drops of dibutyltin diacetate were added to the system, followed by dropwise addition of 242 g. of the compound B prepared in Example of Synthesis 1, which required approximately 40 minutes. The reaction was performed at the above temperature under continuous stirring, until the free isocyanate radical content of the system was reduced to 0.5%. Then the system was cooled to normal temperature.

As a result, Sample No. 5 of the ultraviolet ray addition polymerizable, unsaturated compound was obtained as a resinous substance having good compatibility with vegetable oil, a 67 wt. percent toluene solution of which had a viscosity of 3.7 poises.

EXAMPLE OF SYNTHESIS 6 (SYNTHESIS OF SAMPLE NO. 6)

A 500-ml. capacity four neck flask was equipped with a 360° C. thermometer, glass agitation rod, and a nitrogen gas inlet tube, and was charged with 213.2 g. of alkali-refined linseed oil and 53.2 g. of tung oil. The system was stirred while nitrogen gas was blown thereinto, and its temperature was raised at a constant rate, until it reached 180° C. after approximately an hour. At such temperature, 44 g. of glycerin were added to the system, and the temperature was further raised to 246° C. Then 0.2 g. of lithium hydroxide was added to effect alcoholysis. In the meantime, 3 g. of sample were taken out of the system at regular intervals, and the reaction was terminated when the liquid mixture of the sample with 12 g. of ethanol became transparent at normal temperature. Then 89.6 g. of isophthalic acid were added to the system which was still maintained at 246° C., and the reaction was continued until the acid value became 14–16.

Thus a somewhat transparent, linseed oil modified alkyd resin having a viscosity of 390 poises and a hydroxyl value of 60–65 was obtained, which was labelled as alkyd resin F.

A 500-ml. capacity, four neck flask was equipped with a 200° C. thermometer, glass agitation rod, tortuous cooling pipe and a sample dripping tube, and was charged with 300 g. of the above alkyd resin F. The temperature of the resin was raised at a constant rate under stirring, which reached 70° C. after approximately an hour. At such temperature, several drops of dibutyltin diacetate were dropped into the system under stirring, and thereafter 128 g. of the compound B prepared in Example of Synthesis 1 were added dropwise, which required approximately 30 minutes. The reaction was continued at the same temperature under stirring, until the free isocyanate radical content of the system was reduced to 0.5%. Then the system was cooled to normal temperature.

As a result Sample No. 6 of the ultraviolet ray addition polymerizable, unsaturated compound was obtained as a resinous substance having a viscosity of approximately 23.5 poises as its 67 wt. percent toluene solution, and good compatibility with vegetable oil and the like.

EXAMPLE OF SYNTHESIS 7 (SYNTHESIS OF SAMPLE NO. 7)

A 1,000-ml. capacity four neck flask was equipped with a 360° C. thermometer, glass agitation rod, and a nitrogen gas inlet tube, and was charged with 431.2 g. of alkali-refined linseed oil and 108 g. of tung oil. The system was stirred while nitrogen gas was blown thereinto, and heated at a constant rate so that the temperature reached 180° C. after approximately an hour. At such temperature 92 g. of glycerin were added, and the system was further heated to 246° C. Alcoholysis was effected at such temperature by the addition of 0.4 g. of lithium hydroxide and during the alcoholysis sampling was made at regular intervals, 3 g. each time. When the liquid mixture of the sample with 12 g. of ethanol became transparent at normal temperature, the reaction was terminated, and the system temperature was lowered to 180° C. Then 168.8 g. of phthalic anhydride were added, followed by approximately 2.5 hours reaction at 246° C. The reaction was terminated when the acid value of the product became 13–15. Thus a transparent linseed oil modified alkyd resin having a viscosity of approximately 100 poises and a hydroxyl value of 65–70 was obtained, which was labelled as the alkyd resin G.

A 1,000-ml. capacity four neck flask was equipped with 200° C. thermometer, glass agitation rod, tortuous cooling pipe and a sample dripping tube, and was charged with 700 g. of the above alkyd resin G. The resin was heated at a constant rate under stirring, up to 70° C. after approximately an hour. At the above temperature several drops of dibutyltin diacetate, and then 336 g. of the compound B prepared in Example of Synthesis 1, were dropped into the system under continuous stirring, the latter addition requiring approximately 40 minutes. The reaction was continued at the same temperature under stirring, until the free isocyanate radical content of the system was reduced to 0.5%. Then the reaction was terminated and the system was cooled to normal temperature.

As a result Sample No. 7 of the ultraviolet ray addition polymerizable, unsaturated compound was obtained as a resinous substance having a viscosity of approximately 2 poises as its 67 wt. percent toluene solution, and good compatibility with vegetable oil and the like.

EXAMPLE OF SYNTHESIS 8 (SYNTHESIS OF SAMPLE NO. 8)

A 500-ml. capacity, four neck flask was equipped with a 360° C. thermometer, glass agitation rod and a nitrogen gas inlet tube, and was charged with 83.7 g. of fatty acid of linseed oil, 103.8 g. of WW rosin, 43.2 g. of adipic acid, and 69.3 g. of trimethylolpropane. The system was stirred while nitrogen gas was blown thereinto, and heated at a constant rate, until its temperature reached 200° C. after approximately 1.5 hours. At the above temperature the system was reacted for 5 hours, and re-heated to 240° C. The reaction at 240° C. was continued for 10 hours, until the acid value of the system became 14–16. Thus a rosin modified alkyd resin was formed. The system was allowed to cool to 180° C., and then 103.5 g. of tung oil were added. The system was further allowed to stand in air to cool to 150° C., and then maintained at such temperature for an additional 2 hours under stirring. After the reaction the system was further allowed to cool to 70° C., and several drops of tributylamine were added, and then 135 g. of the compound B prepared in Example of Synthesis 1, were dropped by the order stated, the latter addition requiring approximately an hour. The reaction was continued for 2 hours at the above temperature, until the free isocyanate radical content of the system became 0.5%.

As a result, Sample No. 8 of the ultraviolet ray addition polymerizable, unsaturated compound was obtained as a transparent resinous substance showing good compatibility with vegetable oil and the like. A 67 wt. percent toluene solution of the sample had a viscosity of approximately 1 poise.

EXAMPLE OF SYNTHESIS 9 (SYNTHESIS OF SAMPLE NO. 9)

A 1,000-ml. capacity four neck flask was equipped with a 200° C. thermometer nitrogen gas inlet tube and a tortuous cooling pipe, and was charged with 78 g. of an alicyclic epoxy resin ("Unox EP–206", product of Union Carbide Chemicals Inc.), 283 g. of fatty acid of linseed oil, and 0.361 g. of 2-methylimidazole. The system was heated at a constant rate under stirring while nitrogen gas was blown thereinto, up to 120° C. The system was stirred for approximately 10 hours at such temperature, to provide a transparent, hydroxyl group-containing ester compound having an acid value of approximately 20, and a viscosity of V+ (Gardner-Holdt system, 25° C.). The compound was allowed to cool to 70° C., and 380 g. of 80 wt. percent ethyl acetate solution of an equimolar addition reaction product of 2-hydroxypropyl acrylate and 2,4-tolylenediisocyanate were dropped into the compound at the above temperature, consuming approximately 2 hours. The reaction was continued under stirring after the dropping, still at the same temperature, until the free isocyanate radical content of the system was reduced to 0.5%. Then the system was cooled to normal temperature.

As a result, Sample No. 9 of the ultraviolet ray addition polymerizable, unsaturated compound was obtained as a transparent, resinous substance showing good compatibility with vegetable oil and the like. A 67 wt. percent toluene solution of the sample had a viscosity of approximately 20 poises.

EXAMPLE OF SYNTHESIS 10 (SYNTHESIS OF SAMPLE NO. 10)

A 1,000-ml. capacity, four neck flask was equipped with a 360° C. thermometer, glass agitation rod, and a nitrogen gas inlet tube, and was charged with 146 g. of adipic acid and 200 g. of tridecyl alcohol. The system was heated at a constant rate under stirring and continuous nitrogen gas supply, so that its temperature reached 220° C. after approximately an hour. The reaction was effected while the system was maintained at such temperature under continuous stirring. When the acid value of the reaction product became 17, the system was cooled to 120° C. Then a mixture of 142 g. of glycidyl methacrylate, 0.284 g. of parabenzoquinone as a polymerization inhibitor, and 0.284 g. of 2-methylimidazole as a ring-opening catalyst for epoxy radicals, was dropped into the system at the above temperature, which required approximately an hour. The reaction was continued for the subsequent time of approrimately 5.5 hours at the same temperature under stirring, to provide a hydroxyl group-containing ester compound having an acid value of approximately 5.

The compound was allowed to cool to 70° C., and then 304 g. of the compound B prepared in Example of Synthesis 1 were dropped into the compound, which required approximately 1 hour. The reaction was continued for a subsequent 4 hours at such temperature under stirring, until the free isocyanate radical content of the system was reduced to 0.3%.

As a result, Sample No. 10 of the ultraviolet ray additional polymerizable, unsaturated compound was obtained as a resinous substance having a high viscosity at normal temperature, and good compatibility with vegetable oil and the like.

For the preparation of the printing ink of this invention, the specified ultraviolet ray addition polymerizable, unsaturated compound which is oil-soluble and addition polymerizable as above-described, and the glyceride of an unsaturated fatty acid containing conjugated double bonds such as of tung oil, dehydrated castor oil, oiticica oil, and conjugated synthetic drying oil, etc. are used as the essential components of the vehicle. If necessary, the vehicle may further contain, as optional components, those conventionally employed as vehicle materials for lithographic offset ink, relief printing ink, intaglio ink, and screen process ink, such as fatty oils, e.g., refined linseed oil, polymerized linseed oil, various boiled oils, tung oil, dehydrated castor oil, oiticica oil, soybean oil, safflower oil, cuttefish oil, cod oil, shark oil, whale oil, various synthetic oils, lard, lanoline, and the like; resins, e.g., rosin modified phenol resin, various modified alkyd resins, rosin maleic acid resin, rosin modified pentaerythritol ester resin, xylene resin, various petroleum resins, urethanated and styrenated alkyd resins, cyclized rubber, chlorinated rubber, gilsonite, etc.; solvents, e.g., light oil, spindle oil, spray kerosene, D-machine oil, ink oil, motor oil, Solvesso, ethyl Cellosolve, etc.; and vehicle assistants such as metallic soap or chelate of aluminum, velsicol, lauryl alcohol, wax, etc.

The specific ultraviolet ray addition polymerizable, unsaturated compound, glyceride of unsaturated fatty acid containing conjugated double bonds, and other optional components such as fatty oils, resins, solvents, and vehicle assistants, can serve as the vehicle of the printing ink through simple mixing. Alternatively, the whole or a part of the vehicle component may be heated at an appropriate temperature within the cooking temperature range of 100–300° C., to be converted to a polymerized or resin varnish in advance.

Furthermore, the below-described ultraviolet ray addition polymerizable, unsaturated compounds can also be used as one of the vehicle component, concurrently with the above-described essential vehicle components. That is, the compounds prepared by reacting (J) an addition polymerizable, unsaturated ester compound (which is obtained through the reaction of (H) an addition polymerizable, unsaturated monoepoxy compound such as glycidyl acrylate, glycidyl methacrylate, allyl glycidyl ether, etc., with (I) a saturated or unsaturated higher fatty acid such as the fatty acid of tung oil, linseed oil, dehydrated castor oil, soybean oil, safflower oil, etc.) with (K) a polyisocyanate compound such as tolylenediisocyanate, hexamethylene-diisocyanate, xylylenediisocyanate, etc., at the quantitative ratios of 1.5–0.1 gram equivalents of (K) per 1.0 gram equivalent of (J): and the compounds obtained by substituting up to 50 wt. percent of the compound (J) with an unsaturated monohydroxy compound such as 2-hydroxyethyl acrylate, amino compound such as isobutylamine, or a saturated hydroxy compound such as tridecyl alcohol, are the examples of such compounds. In the following descriptions, such ultraviolet ray addition polymerizable, unsaturated compounds will be called "fatty acid type ultraviolet ray polymerizable compounds" to distinguish them from the ultraviolet ray addition polymerizable, unsaturated compounds of the invention. Those fatty acid type polymerizable compounds show sufficient compatibility with fatty oils such as linseed oil, tung oil, etc., as well as with the ultraviolet ray addition polymerizable, unsaturated compound of this invention, homogeneously dissolving with them at optional mixing ratios. Therefore, they can be advantageously used as one of the vehicle components, together with the essential vehicle components of the subject printing ink, i.e., the ultraviolet ray addition polymerizable, unsaturated compound and glyceride of an unsaturated fatty acid containing conjugated double bonds.

As the ultraviolet ray polymerization initiator useful for the invention, for example, the following may be named: benzoin type polymerization initiators such as benzoin, benzoin methyl ether, benzoin ethyl ether, and benzoin propyl ether; halogenated sulfonyl type polymerization initiators such as α-naphthalenesulfonyl chloride, β-naphthalenesulfonyl chloride, naphthalenedisulfonyl chloride, o-toluenesulfonyl chloride, p-chlorobenzenesulfonyl chloride, and p-iodobenzenesulfonyl chloride; anthraquinone type polymerization initiators such as α-chloroanthraquinone and β-methylanthraquinone; and acetonitrile type polymerization initiators such as α-bromo(p-nitrophenyl) acetonitrile. Among the above-named, benzoin methyl ether and naphthalenesulfonyl chloride show particularly favorable effect for the printing ink of this invention.

Also as the coloring matters useful for the printing ink of this invention, inorganic pigments such as carbon black, chrome yellow, titanium white, Milori blue, and Chrome Vernilion; organic pigments such as Hansa Yellow, Benzidine Yellow, Vulcan Orange, Permanent Orange, Lake Red G, Brilliant Carmine 6B, Rhodamine Lake, Eosine, Phloxine, Victoria Blue Lake, Phthalocyanine Green, Phthalocyanine Blue, Quinacridone Red, and Dioxazine Violet; and dyestuffs such as Alkali Blue Toner, Methyl Violet, etc. may be named. If required, bodies such as calcium carbonate, precipitated barium sulfate, alumina white, etc., may be used concurrently with those pigments.

Furthermore, the printing ink of this invention may optionally contain, besides the vehicle, polymerization initiator, and the coloring matters, driers composed of a metallic soap of lead, manganese, cobalt, nickel, rare earth elements, etc.; and various ink assistants such as bentonite, Orben, polyethylene, varnishes, greases, vaseline, eugenol, cornstarch, etc.

The method of preparing the printing ink of this invention from those starting materials is the same to that of conventional lithographic offset ink, relief printing ink, intaglio ink and screen process ink. That is, an appropriate pigment or dyestuff is selected according to the characteristics required for the ink, e.g., color, color strength, light resistance, and solvent resistance, etc., which may be mixed with the vehicle, polymerization initiator, and ink assistants, as dry pigment. Or, the pigment may be flushed with a part of the vehicle at quantitative ratios ranging, as pigment to vehicle, 15:85–35:65 by weight, and mixed with the remaining ink components as flush pigment. The pigment and/or dyestuff may be mixed with, or dispersed in, the vehicle and ink assistants in the amount ranging from zero to 70 wt. percent. Further, bodies may be added in the amount ranging from zero to 40 wt. percent based on the weight of the vehicle plus ink assistants, which, if necessary, are thoroughly mixed and dispersed in the rest of the composition by means of pre-mixer. Then the composition is milled by means of three-roll mill or a suitable kneader until sufficient degree of milling is obtained. The milling temperature is preferably not higher than 60° C.

The printing ink of this invention preferably contains at least 20% by weight to the vehicle of the oil-soluble and addition polymerizable ultraviolet ray addition polymerizable, unsaturated compound plus the glyceride of an unsaturated fatty acid containing conjugated double bonds. The suitable weight ratio between the two essential components ranges from 2:8 to 8:2. Also the preferred amount of the ultraviolet ray polymerization initiator is, based on the total weight of the ink, 1–10% by weight, particularly 2–6% by weight, and that of the ink assistants, 0–10% by weight.

For explaining the invention in fuller details, working examples are given hereinafter, with the understanding that they are no more than illustrative of the invention, and in no way limitative of the scope thereof. In the examples, all parts are by weight.

Example 1

In order to compare the effects of various ultraviolet ray polymerization initiators on the set-drying property of the subject ink, Group I printing inks were prepared according to the following receipe.

| Sample ink group I: | Parts |
|---|---|
| Brilliant Carmine 6B | 20 |
| Sample No. 6 of ultraviolet ray addition polymerizable, unsaturated compound | 15 |
| Polymerized tung oil | 65 |
| Polymerization initiator | 4 |
| Total | 104 |

Twelve types of ink of the above composition were each sufficiently milled in a three-roll mill, and spread on a sheet of art coated paper at an ink pick-up of 0.15 cc. (the ink film thickness: approximately 3μ, corresponding to that of ordinary printing). Each printed paper was immediately irradiated by an ultraviolet ray radiator containing one ozoneless high pressure mercury lamp provided with a reflection cover (output: 2 kw., output density, 28 w./cm., product of Phillips Co., Model HTQ-7), at a space of 15 cm., and the time required for set-drying of the printed ink film was measured.

The results were as given in Table 1 below. From the results it can be understood that, compared with the set-drying time of Sample No. 1–12 ink containing no ultraviolet ray polymerization initiator, all the rest of sample inks have remarkably shortened set-drying time, and that particularly the benzoin type initiators exhibit an excellent effect.

TABLE 1

| Sample ink number | Polymerization initiator | Set-drying time (sec.) |
|---|---|---|
| I-1 | Benzoin | 3-4 |
| I-2 | Benzoin methyl ether | 1-2 |
| I-3 | Benzoin ethyl ether | 1-2 |
| I-4 | Benzoin propyl ether | 2 |
| I-5 | α-Bromo (p-nitrophenyl)acetonitrile | 1-2 |
| I-6 | β-Naphthalenesulfonyl chloride | 1-2 |
| I-7 | p-Chlorobenzenesulfonyl chloride | 2-3 |
| I-8 | p-Iodobenzenesulfonyl chloride | 3 |
| I-9 | o-Toluenesulfonyl chloride | 2 |
| I-10 | α-Chloroanthraquinone | 2 |
| I-11 | β-Methylanthraquinone | 2-3 |
| I-12 | | 10 |

Example 2

Eight sample inks of the composition as given in Table 2 were prepared as Group II, using four typical types of pigments, in the manner similar to Example 1. The set-drying time of the film of each printing ink under the identical spreading and irradiation conditions with those described in Example 1 was measured, with the results given in Table 2.

TABLE 2

| Sample ink number | II-1 | II-2 | II-3 | II-4 | II-5 | II-6 | II-7 | II-8 |
|---|---|---|---|---|---|---|---|---|
| Starting materials: | | | | | | | | |
| Benzidine Yellow | 15 | | | | 15 | | | |
| Brilliant Carmine 6B | | 20 | | | | 20 | | |
| Phthalocyanine Blue | | | 20 | | | | 20 | |
| Carbon black | | | | 20 | | | | 20 |
| Sample No. 4 of ultraviolet ray addition polymerizable, unsaturated compound | 50 | 45 | 45 | 45 | | | | |
| Sample No. 6 of ultraviolet ray addition polymerizable, unsaturated compound | | | | | 50 | 45 | 45 | 45 |
| Tung oil | 35 | 35 | 35 | 35 | 35 | 35 | 35 | 35 |
| Benzoin methyl ether | 5 | 5 | 5 | 5 | 5 | 5 | 5 | 5 |
| Set-drying time | 1.0 | 1.0 | 2.0 | 2.5 | 1.0 | 1.0 | 2.0 | 2.5 |

Note.—The numeral values of starting materials in Table 2 denote the parts by weight contained in each ink composition.

All the sample inks of this group showed printability satisfactory for lithographic offset ink, and when used for printing on coated papers and coated boards, with a sheet lithographic offset automatic two-color printing machine (Rolland Record, Model RZK II) equipped with an ultraviolet ray radiator, at a printing speed of 5,000 sheets/hr. and the printed papers were piled up as two stacks of 5,000 sheets and 3,000 sheets each without spraying powders no set-off of the piled prints took place.

Example 3

A synthetic resin varnish A was prepared according to the following recipe.

Synthetic resin varnish A: Parts
(a) Rosin pentaerythritol ester _____ 40
(b) Tung oil _____ 10
(c) Light oil _____ 40
(d) Aluminum octoate _____ 1
(e) Light oil _____ 13

Total _____ 104

The above (a), (b), and (c) were together dissolved by heating for one hour at the cooking temperature of 180±5° C., in an air-intercepted atmosphere, and then cooled. Into the solution (d) as dispersed in (e) was then added, followed by 30 minutes heating at 150±5° C., for gelling the system. The viscosity of the gelled system was 380 poises.

This resin varnish was used in the preparation of a sheet lithographic offset ink III from the below-specified materials, which were milled in a three-roll mill.

Sheet lithographic offset ink III: Parts
Brilliant Carmine 6B _____ 20
Sample No. 4 of ultraviolet ray addition polymerizable, unsaturated compound _____ 20
Synthetic resin varnish A _____ 55
Benzoin methyl ether _____ 5

Total _____ 100

This printing ink had a tack value (IV) as measured with an Iinkometer of 11±1, a diameter (DM) as measured with Spreadometer (American Ink Maker, 28 (9) 28 (1950) of 32±1 (mm.), and a slope (S) of 6. The set-drying time of this ink under the identical spreading and irradiation conditions with those of Example 1 was 1.5 seconds. The ink also exhibited satisfactory printability when used in printing under the identical conditions as Example 2.

Example 4

A synthetic resin varnish B was prepared according to the following recipe.

Synthetic resin varnish B: Parts
(a) Rosin modified phenol resin (Beckacite 1126, product of Dainippon Ink & Chemicals, Inc.) _____ 35
(b) Tung oil _____ 45
(c) Light oil _____ 20

Total _____ 100

The above (a), (b), and (c) were dissolved together under heating at the cooking temperature of 170±5° C. for an hour, in an air-intercepted atmosphere. The viscosity of the resulting solution was 300±30 poises.

This resin varnish was employed in the preparation of a sheet lithographic offset ink IV by milling the composition below in a three-roll mill.

Sheet lithographic offset ink IV: Parts
Phthalocyanine Blue _____ 20
Sample No. 1 of ultraviolet ray addition polymerizable, unsaturated compound _____ 30
Tung oil _____ 30
Benzoin ethyl ether _____ 4
Synthetic resin varnish B _____ 20

Total _____ 104

This printing ink had a IV of 15±1, DM of 34±10, and a S of 8. Its set-drying time under the identical spreading and irradiation conditions as Example 1 was 2.5 seconds.

Example 5

Sample No. 2 of the ultraviolet ray addition polymerizable, unsaturated compound was used in the preparation of a sheet lithographic offset ink V of the following composition. The starting materials were kneaded in a three-roll mill.

Sheet lithographic offset ink V: Parts
Benzidine Yellow _____ 15
Sample No. 2 of ultraviolet ray addition polymerizable, unsaturated compound _____ 50
Tung oil _____ 35
β-Naphthalenesulfonyl chloride _____ 4

Total _____ 104

This printing ink had satisfactory printability as an offset ink, as proven by its TV of 18±1, DM of 34±1, and S of 8. Its set-drying time under the identical spreading and irradiation conditions as of Example 1 was 2 seconds.

Example 6

A synthetic resin varnish C was prepared using a polymerized tung oil (viscosity: 90±10 poises), according to the recipe below:

Synthetic resin varnish C: Parts
- (a) Sample No. 7 of ultraviolet ray addition polymerizable, unsaturated compound _____ 30
- (b) Polymerized tung oil _____ 35

Total _____ 65

The above (a) and (b) were together dissolved by heating at the cooking temperature of 145±5° C. for 20 minutes. The viscosity of the resulting solution was 1,000±100 poises.

This resin varnish was used in the preparation of an offset rotation printing ink VI in a three-roll mill, at the following blending ratios:

Offset rotation printing ink VI: Parts
- Benzidine Yellow _____ 15
- Synthetic resin varnish C _____ 65
- Light oil _____ 15
- α-Naphthalenesulfonyl chloride _____ 4

Total _____ 99

This printing ink had a IV of 8±1, DM of 33±2, and S of 5.5, thus showing satisfactory printability as an offset rotation printing ink. Its set-drying time measured under the identical spreading and irradiation conditions as of Example 1 was 1.0 second.

Example 7

A fatty acid type ultraviolet ray polymerizable compound was synthesized as follows.

A 1,000-mil capacity four neck flask was equipped with a 200° C. thermometer, glass agitation rod, nitrogen gas inlet tube and a tortuous cooling pipe, and was charged with 566 g. of tung oil, 284 g. of glycidyl methacrylate (containing 100 p.p.m. of hydroquinone monomethyl ether), 568 mg. of para-benzoquinone, and 850 mg. of 2-methylimidazole. The system temperature was raised at a constant rate under continuous nitrogen gas supply, which reached 110° C. after one hour of heating. At such temperature the system was stirred for 4 hours, and for approximately 4 additional hours at a slightly elevated temperature of 120° C. As a result, a transparent, unsaturated ester compound having an acid value of approximately 6 and a viscosity of H (Gardner-Holdt system, 25° C.) was obtained.

Separately, a 1,000-ml. capacity three neck flask was equipped with a 100° C. thermometer, glass agitation rod and a tortuous cooling pipe with its tip sealed with silica gel. The apparatus was changed with 174 g. of tolylenediisocyanate and 134 g. of tung oil. As soon as the system was heated to 70° C., 74 g. of isobutanol were dropped into the flask, which required approximately 45 minutes. Still at the same temperature, 425 g. of the above unsaturated ester compound were added to the system, which required approximately 1.5 hours. The reaction was continued for further 3 hours under stirring at the same temperature, until the free isocyanate radical content was reduced to 0.5%. Then the system was cooled to normal temperature.

The fatty acid type ultraviolet ray polymerizable compound obtained was transparent, showed good oil-solubility, and had a viscosity at 25° C. of approximately 500 poises.

A synthetic resin varnish D was prepared using the above fatty acid type ultraviolet ray polymerizable compound and Sample No. 7 of the ultraviolet ray addition polymerizable, unsaturated compound of this invention, according to the following recipe.

Synthetic resin varnish D: Parts
- (a) Sample No. 7 of ultraviolet ray polymerizable, unsaturated compound _____ 20
- (b) Fatty acid type ultraviolet ray polymerizable compound _____ 20
- (c) Tung oil _____ 30

Total _____ 70

The above (a), (b), and (c) were together cooked for 20 minutes at 145±5° C., thereby being given a viscosity of 400±50 poises.

This synthetic resin varnish D was used in the preparation of a relief printing ink VII of the following composition in a three-roll mill.

Relief printing ink VII: Parts
- Phthalocyanine Blue _____ 15
- Synthetic resin varnish D _____ 70
- Tung oil _____ 10
- α-Bromo (p-nitrophenyl) acetonitrile _____ 5

Total _____ 100

This printink ink had a TV of 11±1, DM of 34±2, and a S of 7.5, thus showing satisfactory printability as a heliotype ink. Its set-drying time under the identical spreading and irradiation conditions as of Example 1 was 2.0 seconds.

Example 8

A type printing ink VIII of the following composition was prepared using a three-roll mill.

Type printing ink VIII: Parts
- Brilliant Carmine 6B _____ 11
- Calcium carbonate _____ 10
- Precipitated barium sulfate _____ 14
- Sample No. 3 of ultraviolet ray addition polymerizable, unsaturated compound _____ 35
- Tung oil _____ 25
- Benzoin methyl ether _____ 5

Total _____ 100

This printing ink had a TV of 7±1 and DM of 34±2, thus exhibiting satisfactory printability as a type printing ink. Its set-drying time under the identical spreading and irradiation conditions as of Example 1 was 2 seconds.

Example 9

A synthetic resin varnish E was prepared according to the recipe below.

Synthetic resin varnish E: Parts
- (a) Sample No. 6 of ultraviolet ray addition polymerizable, unsaturated compound _____ 20
- (b) Polymerized tung oil (90 poises) _____ 60

Total _____ 80

The above (a) and (b) were together dissolved by heating at the cooking temperature of 145±5° C. for 20 minutes, thereby being given a viscosity of 600±50 poises.

A metallic plate printing ink IX of the following composition was prepared using this resin varnish, in a three-roll mill.

Metallic plate printing ink IX: Parts
- Watchung Red _____ 20
- Synthetic resin varnish E _____ 80
- Benzoin methyl ether _____ 4

Total _____ 104

This printing ink had a TV of 20±1, DM of 30±1, and S of 6, thus showing sufficient printability as a metallic plate printing ink. Its set-drying time as spread on a tin plate to a film thickness of approximately 6µ and irradiated with ultraviolet rays in the manner identical with that of Example 1 was 3 seconds. Also the time required for the film to be completely hardened was 20 seconds. The hardened film showed the properties required for metallic plate printing, in all of the adherability test by crosscut method, retort-resistance test (13 pounds, 90 minutes' quenching method) and screw cap punch test.

Example 10

A synthetic resin varnish F was prepared according to the recipe below:

Synthetic resin varnish F: | Parts
--- | ---
(a) Rosin pentaerythritol ester | 18
(b) Ester gum | 33
(c) Light oil | 49
Total | 100

The above (a), (b), and (c) were together dissolved by heating at the cooking temperature of 170±5° C. for approximately an hour in an air-intercepted atmosphere, thereby being given a viscosity of 70±5 poises.

This resin varnish was used in the preparation of an intaglio ink X of the following composition, by means of a three-roll mill.

Intaglio ink X: | Parts
--- | ---
Phthalocyanine Blue | 6
Precipitated barium sulfate | 60
Synthetic resin varnish F | 15
Sample No. 6 of ultraviolet ray addition polymerizable, unsaturated compound | 15
Tung oil | 5
β-Naphthalenesulfonyl chloride | 4
Total | 105

This printing ink had a DM of 22±1, and satisfactory printability as an intaglio ink. Its set-drying time as spread on a certificate paper to a film thickness of approximately 8µ and measured under the identical irradiation conditions as of Example 1 was approximately 4 seconds.

Example 11

A screen process ink XI was prepared by kneading the following composition in a three-roll mill.

Screen process ink XI: | Parts
--- | ---
Brilliant Carmine 6B | 15
Titanium white | 10
Paraffin wax | 3
Sample No. 7 of ultraviolet ray addition polymerizable, unsaturated compound | 30
Polymerized tung oil | 10
Selvesso-150 (aromatic hydrocarbon type mixed solvent, product of Shell Petroleum Co.) | 28
α-naphthalenesulfonyl chloride | 4
Total | 100

This printing ink showed satisfactory printability as a screen process ink, and its set-drying time measured as to an approximately 10µ thick ink film spread on a styrene sheet under the identical irradiation conditions as of Example 1 was approximately 5 seconds.

Example 12

An offset rotation printing ink XII of the following composition was prepared by kneading the named components together in a three-roll mill.

Offset rotation printing ink XII: | Parts
--- | ---
Benzidine Yellow | 20
Sample No. 5 of ultraviolet ray addition polymerizable, unsaturated compound | 20
Fatty acid type ultraviolet ray polymerizable compound [1] | 20
Tung oil | 25
Light oil | 5
Carnauba wax | 1
Benzoin methyl ether | 4
Total | 95

[1] The compound identified in Example 7.

This printing ink had a TV of 7±1, DM of 38±2, and S of 8, thus showing satisfactory printability as an offset rotation printing ink. Its set-drying time measured under the identical spreading and irradiation conditions as of Example 1 was 1 second.

Example 13

An intaglio ink XIII of the following composition was prepared by kneading the named components together in a three-roll mill.

Intaglio ink XIII: | Parts
--- | ---
Brilliant Carmine 6B | 10
Calcium carbonate | 55
Sample No. 8 of ultraviolet ray addition polymerizable, unsaturated compound | 25
Tung oil | 10
Benzoin ethyl ether | 5
Total | 110

This printing ink had a DM of 22±2, and satisfactory printability as an intaglio ink. Its set-drying time measured with a 6µ thick film under the identical spreading and irradiation conditions as of Example 1 was 3.5 seconds.

We claim:

1. Photopolymerizable printing ink which contains a photoinitiator and is cured under irradiation of ultraviolet rays and is characterized in that the same comprises, as the essential vehicle components, (A) a photopolymerizable, unsaturated compound obtained by the reaction of (1) a hydroxyl group-containing, fatty oil-soluble compound selected from (i) an oil modified alkyd resin, (ii) vinyl monomer modified alkyd resin, (iii) rosin modified alkyd resin, (iv) phenolic resin modified alkyd resin, (v) epoxy resin modified alkyd resin, (vi) alkyd resin of which a part of the carboxyl radicals are esterified by an unsaturated monoepoxy compound, (vii) ester compound containing by-produced hydroxyl groups, said ester compound being obtained by the reaction of higher fatty acid with an epoxy resin, and (viii) ester compound containing by-produced hydroxyl groups, said ester compound being obtained by the reaction of a polyvalent carboxylic acid with a higher alcohol and unsaturated monoepoxy compound with (2) a reaction product of a polyisocyanate compound selected from 2,4-tolylenediisocyanate, 2,6-tolylenediisocyanate, 2,4-xylylenediisocyanate, lysinediisocyanate, diphenylmethane-4,4' - diisocyanate, triphenylmethane-4,4',4"-triisocyanate, naphthylene-1,5-diisocyanate, 3,3' - dimethyldiphenylmethane-4,4'-diisocyanate, diphenylether-4,4' - diisocyanate, diphenyl-2,4,4-triisocyanate, 1,3,5 - trimethylbenzene-2,4,6-triisocyanate and diphenyl methane-2,4,2',4' - tetraisocyanate with a photopolymerizable, unsaturated compound containing one hydroxyl group selected from 2-hydroxyethyl methacrylate, 2-hydroxyethyl acrylate, 2-hydroxypropyl acrylate, 2-hydroxypropyl methacrylate, N-hydroxymethyl acrylamide, N-hydroxymethyl metharylamide, polyethylene glycol monoacrylate, polypropylene glycol monomethacrylate, glycerin dimethacrylate, trimethylolpropane dimethacrylate, pentaerythritol trimethacrylate, allyl alcohol, 2-chloroallyl alcohol and an equimolar reaction product of glycidyl methacrylate with acrylic acid, and (B) a glyceride of an unsaturated fatty acid containing a conjugated double bond, the weight ratio between (A) and (B) ranging from 2:8 to 8:2.

2. The photopolymerizable printing ink of claim 1, wherein said photoinitiator is naphthalene sulfonyl chloride or benzoin methyl ether.

3. The photopolymerizable printing ink of claim 1, wherein said glyceride of unsaturated fatty acid containing a conjugated double bond is tung oil.

References Cited

UNITED STATES PATENTS

| | | | |
|---|---|---|---|
| 3,371,056 | 2/1968 | Delius | 260—22 TN |
| 3,509,234 | 4/1970 | Burlant et al. | 204—159.15 |
| 3,008,242 | 11/1961 | Sites et al. | 117—93.31 |
| 3,531,317 | 9/1970 | Patheiger et al. | 117—93.31 |
| 3,041,203 | 6/1962 | Sites et al. | 117—93.31 |
| 3,511,687 | 5/1970 | Keyl et al. | 204—159.19 |
| 3,560,237 | 2/1971 | Miller | 204—159.19 |
| 3,562,125 | 2/1971 | Van Gasse | 204—159.15 |

FOREIGN PATENTS 248,844  1/1964  Australia  204—159.15

DONALD E. CZAJA, Primary Examiner

R. W. GRIFFIN, Assistant Examiner

U.S. Cl. X.R.

106—20, 28; 117—93.31; 204—159.15, 159.19; 260—18 TN

UNITED STATES PATENT OFFICE
CERTIFICATE OF CORRECTION

Patent No. 3,781,214  Dated December 25, 1973

Inventor(s) Nemoto YUHEI ET AL

It is certified that error appears in the above-identified patent and that said Letters Patent are hereby corrected as shown below:

IN THE CLAIMS:

In Column 20, line 73 thereof: cancel "pentaerythritol" and substitute therefor --pentacrythritol--

Signed and sealed this 9th day of April 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,781,214   Dated December 25, 1973

Inventor(s) Yuhei Nenoto et al.

It is certified that error appears in the above-identified patent and that said Letters Patent are hereby corrected as shown below:

Column 20, line 73, "pentacrythritol" should read -- pentaerythritol --.

Signed and sealed this 18th day of February 1975.

(SEAL)
Attest:

RUTH C. MASON
Attesting Officer

C. MARSHALL DANN
Commissioner of Patents
and Trademarks